United States Patent
Maruyama et al.

(10) Patent No.: US 11,959,882 B2
(45) Date of Patent: Apr. 16, 2024

(54) OPTICAL DEVICE AND PHOTOACOUSTIC MICROSCOPE

(71) Applicant: RIKEN, Saitama (JP)

(72) Inventors: Masayuki Maruyama, Saitama (JP); Kiwamu Kase, Saitama (JP); Norihito Saito, Saitama (JP); Satoshi Wada, Saitama (JP)

(73) Assignee: RIKEN, Saitama (JP)

( * ) Notice: Subject to any disclaimer, the term of this patent is extended or adjusted under 35 U.S.C. 154(b) by 535 days.

(21) Appl. No.: 17/092,308

(22) Filed: Nov. 8, 2020

(65) Prior Publication Data

US 2021/0055265 A1    Feb. 25, 2021

Related U.S. Application Data

(63) Continuation of application No. PCT/JP2019/018489, filed on May 9, 2019.

(30) Foreign Application Priority Data

May 9, 2018    (JP) .................... 2018-090998

(51) Int. Cl.
- *G01N 29/06* (2006.01)
- *G01N 29/24* (2006.01)
- (Continued)

(52) U.S. Cl.
CPC ..... *G01N 29/0681* (2013.01); *G01N 29/2418* (2013.01); *G01N 29/28* (2013.01);
(Continued)

(58) Field of Classification Search
CPC .......... G01N 29/0681; G01N 29/2418; G01N 29/28; G01N 21/1702; G01N 2021/1706; G02B 5/001; G02B 19/0019; G02B 27/30
See application file for complete search history.

(56) References Cited

U.S. PATENT DOCUMENTS 3,645,606 A * 2/1972 La Vantine .............. G02B 5/09
                                             359/853
5,796,112 A    8/1998 Ichie
(Continued)

FOREIGN PATENT DOCUMENTS

JP    H09138373 A    5/1997
JP    2010021585 A    1/2010
(Continued)

OTHER PUBLICATIONS (ISA/237) Written Opinion of the International Search Authority for International Patent Application No. PCT/JP2019/018489, mailed by the Japan Patent Office dated Jul. 23, 2019.
(Continued)

*Primary Examiner* — Tarun Sinha

(57) ABSTRACT

An optical device includes a first axicon lens to which collimated light is incident and which is configured to form diverging ring-shaped light; a lens to which the ring-shaped light formed by the first axicon lens is incident and which is configured to form ring-shaped collimated light; and a condensing mirror that is configured to condense the ring-shaped collimated light formed by the lens. A photoacoustic microscope includes the optical device described above and a detector that is configured to detect an acoustic wave caused by light condensed by the condensing mirror.

8 Claims, 23 Drawing Sheets

(51) Int. Cl.
*G01N 29/28* (2006.01)
*G02B 5/00* (2006.01)
*G02B 19/00* (2006.01)
*G02B 27/30* (2006.01)

(52) U.S. Cl.
CPC ......... *G02B 5/001* (2013.01); *G02B 19/0019* (2013.01); *G02B 27/30* (2013.01)

(56) References Cited

U.S. PATENT DOCUMENTS

| | | | | |
|---|---|---|---|---|
| 6,400,856 | B1* | 6/2002 | Chin | G02B 6/12007 385/11 |
| 2001/0017838 | A1* | 8/2001 | Hatano | G11B 7/1362 369/112.28 |
| 2004/0113157 | A1 | 6/2004 | Abe | |
| 2013/0023752 | A1* | 1/2013 | Khuri-Yakub | A61B 5/0095 600/407 |
| 2014/0192355 | A1 | 7/2014 | Froigneux | |
| 2016/0058295 | A1* | 3/2016 | Imai | A61B 5/0037 600/407 |
| 2016/0113507 | A1* | 4/2016 | Reza | A61B 5/0095 356/450 |
| 2016/0223721 | A1* | 8/2016 | Kiontke | G02B 27/005 |

FOREIGN PATENT DOCUMENTS

| | | |
|---|---|---|
| JP | 2013027482 A | 2/2013 |
| JP | 2016101425 A | 6/2016 |

OTHER PUBLICATIONS

Muhammad Rameez Chatni et al., "Functional photoacoustic microscopy of pH", Journal of Biomedical Optics, Oct. 2011, vol. 16(10), pp. 100503-1 to 100503-3.

Office Action issued for counterpart Japanese Application No. 2020-518330, issued by the Japanese Patent Office dated Feb. 7, 2023 (drafted on Jan. 30, 2023).

Extended European Search Report for European Patent Application No. 19799135.9, issued by the European Patent Office dated Dec. 15, 2021.

* cited by examiner

OPTICAL DEVICE AND PHOTOACOUSTIC MICROSCOPE

CROSS REFERENCE TO RELATED APPLICATION

The contents of the following Japanese patent application and internal application are incorporated herein by reference, Japanese Patent Application No. 2018-090998 filed on May 9, 2018 and International Application No. PCT/JP2019/018489 filed on May 9, 2019.

BACKGROUND

1. Technical Field

The present invention relates to an optical device and a photoacoustic microscope.

2. Related Art

Technology is known for performing imaging based on a response of an object caused by irradiating the object with light. For example, a photoacoustic microscope is known that performs imaging by irradiating an object with light and detecting acoustic waves generated due to the radiated light (see Non-Patent Document 1, for example).

Non-Patent Document 1: Muhammad Rameez Chatni et al., "Functional photoacoustic microscopy of pH", Journal of Biomedical Optics, October 2011, Vol. 16(10), pp. 100503-1 to 100503-3

DESCRIPTION OF EXEMPLARY EMBODIMENTS

Hereinafter, some embodiments of the present invention will be described, but the embodiments do not limit the invention according to the claims. All the combinations of the features described in the embodiments are not necessarily essential to means provided by aspects of the invention.

Figure 19:
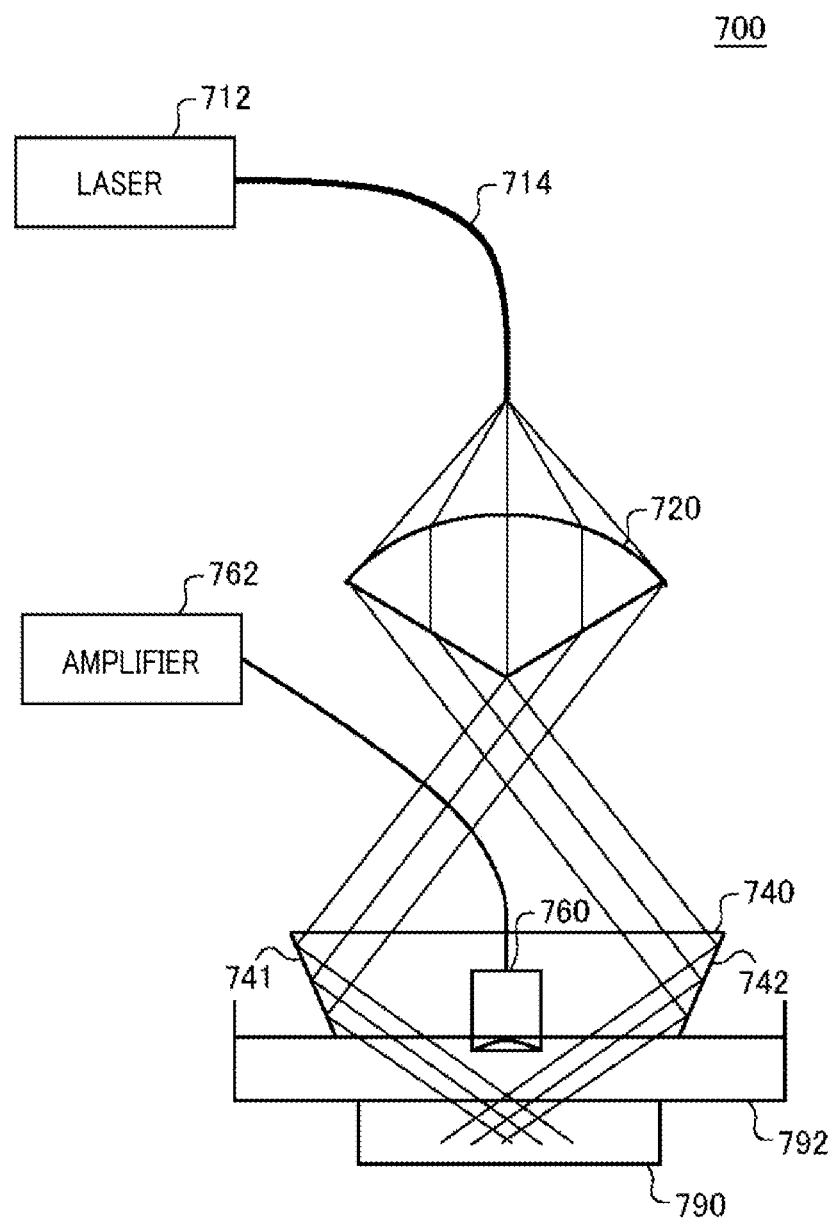
FIG. 19 is a conceptual diagram showing a basic configuration of a photoacoustic microscope 700.

First, the basic configuration of an optical device for a photoacoustic microscope will be described. FIG. 19 is a conceptual diagram showing a basic configuration of a photoacoustic microscope 700. The photoacoustic microscope 700 includes a laser 712, an optical fiber 714, a lens 720, a truncated cone prism 740, an acoustic wave sensor 760, and an amplifier 762. The lens 720 and the truncated cone prism 740 form an optical device for forming irradiation light that is radiated onto a target object 790.

The laser 712 emits light to be radiated onto the target object 790. The light emitted by the laser 712 becomes incident to one end portion of the optical fiber 714 and is emitted as divergent light from the other end portion of the optical fiber 714. The divergent light emitted from the optical fiber 714 becomes incident to the lens 720. Diverging ring-shaped light is formed by the lens 720. The ring-shaped light formed by the lens 720 becomes incident to the truncated cone prism 740.

The truncated cone prism 740 has a truncated cone shape. The ring-shaped light that has become incident to the truncated cone prism 740 is totally reflected by an internal side surface of the truncated cone prism 740. The irradiation light to be radiated onto the target object 790 is formed by the truncated cone prism 740.

Due to the irradiation light from the truncated cone prism 740 becoming incident to the target object 790, an acoustic wave is generated due to light absorption in a region of the target object 790 through which the irradiation light passes. The generated acoustic wave is propagated through water in a water tank 792 and reaches the acoustic wave sensor 760.

The acoustic wave sensor 760 includes an acoustic lens, and generates an acoustic wave signal from the acoustic wave generated at the focal point position of the acoustic lens. The acoustic wave signal is supplied to the amplifier 762 as an electric signal and is amplified. The strength of the photoacoustic wave is calculated from the electric signal amplified by the amplifier 762 and converted into an image.

In the photoacoustic microscope 700, when the irradiation light to be radiated onto the target object 790 is formed using light with different wavelengths, the focal point of the lens 720 differs according to the wavelength, and therefore the condensation position of the irradiation light to be radiated onto the target object 790 differs according to the wavelength.

Furthermore, the line 741 and the line 742 shown in FIG. 19 represent the inner surface on which the truncated cone prism 740 reflects the incident light. The light that has been totally reflected by the portion represented by the line 741 is substantially not condensed. Similarly, the light that has been totally reflected by the portion represented by the line 742 is substantially not condensed. Therefore, according to the truncated cone prism 740, it is impossible to sufficiently increase the condensation amount of the irradiation light to be radiated onto the target object 790, and so the irradiation light diverges widely in a range outside the focal point position of the acoustic wave sensor 760. Therefore, the usage efficiency of the light energy generated by the laser 712 is lowered.

Figure 20:
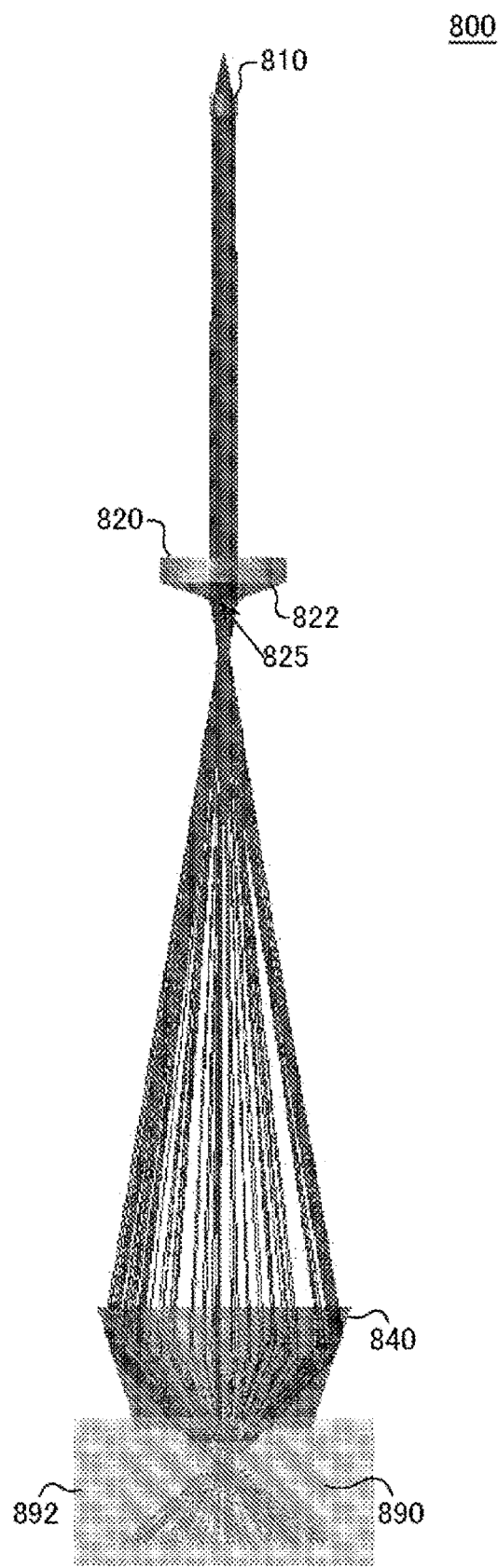
FIG. 20 schematically shows a ray diagram of an example of an optical device 800 related to FIG. 19.

FIG. 20 schematically shows a ray diagram of an example of an optical device 800 related to FIG. 19. The optical device 800 includes a transparent collimator 810, an axicon lens 820, and a truncated cone prism 840. In the optical device 800, the combination of the transparent collimator 810 and the axicon lens 820 is an optical element corresponding to the lens 720 of FIG. 19. The truncated cone prism 840, a target object 890, and a water tank 892 correspond respectively to the truncated cone prism 740, the target object 790, and the water tank 792.

Figure 21:
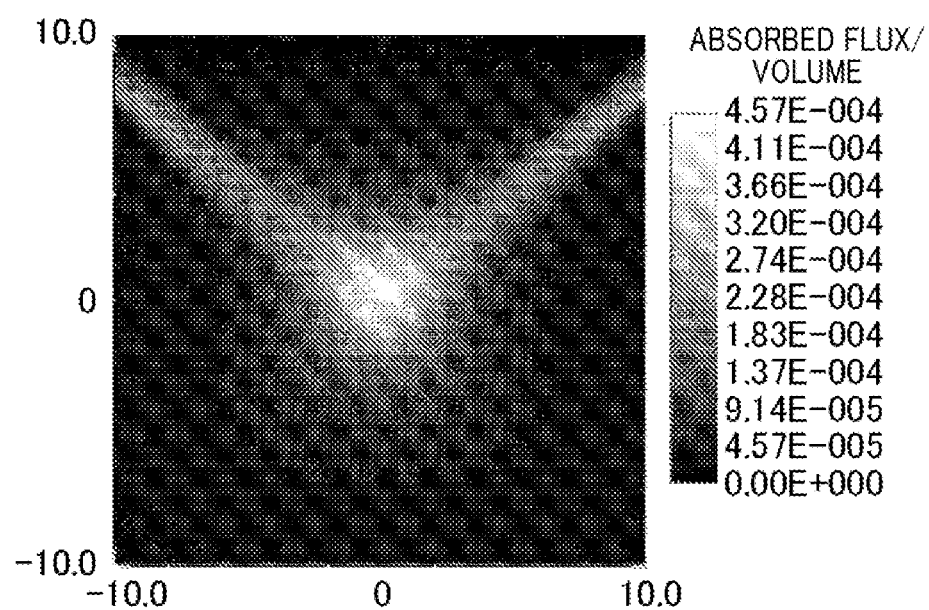
FIG. 21 shows the absorbed luminous flux per unit volume of light with a wavelength of 500 nm formed by the optical device 800.
Figure 22:
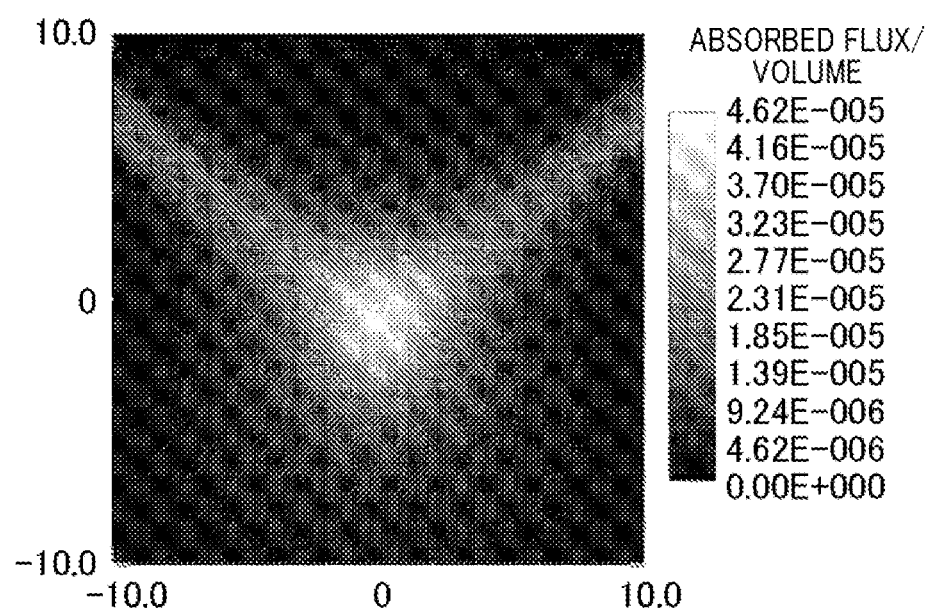
FIG. 22 shows the absorbed luminous flux per unit volume of light with a wavelength of 750 nm formed by the optical device 800.
Figure 23:
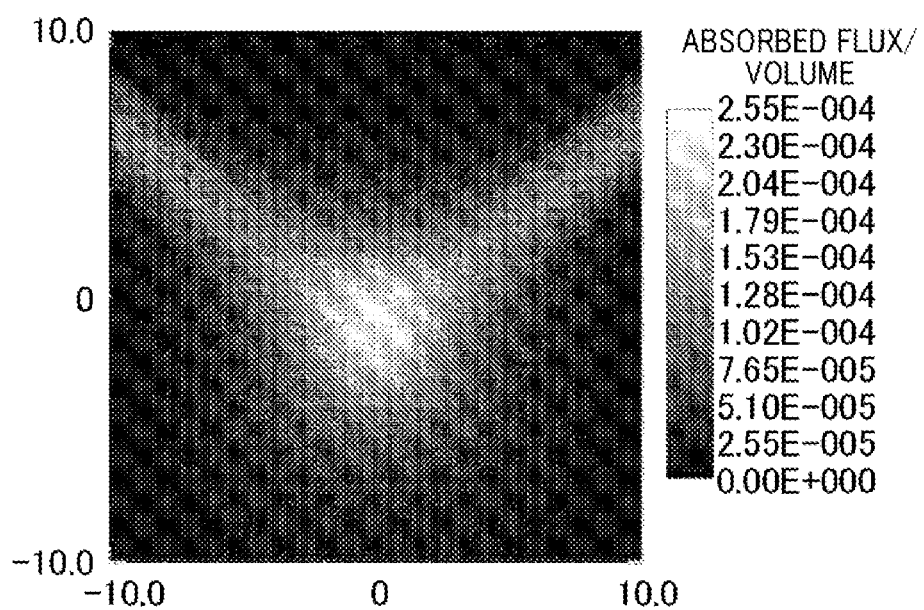
FIG. 23 shows the absorbed luminous flux per unit volume of light with a wavelength of 1000 nm formed by the optical device 800.

FIG. 21 shows the absorbed luminous flux per unit volume of light with a wavelength of 500 nm formed by the optical device 800. FIG. 22 shows the absorbed luminous flux per unit volume of light with a wavelength of 750 nm formed by the optical device 800. FIG. 23 shows the absorbed luminous flux per unit volume of light with a wavelength of 1000 nm formed by the optical device 800.

FIGS. 21 to 23 are distribution diagrams of the luminous flux collected by the target object. In the distribution diagrams of FIGS. 21 to 23, the vertical axes indicate the optical axis direction and the horizontal axes indicate a direction orthogonal to the optical axis. As shown in FIGS. 21 to 23, it is understood that the condensation position in the optical axis direction substantially differs according to the wavelength, and that the position in the optical axis direction at which the absorbed luminous flux is at a maximum therefore differs according to the wavelength.

In general, since the refractive index of the optical material differs according to the wavelength, the focal point of the transparent optical element differs according to the wavelength. Therefore, when light with different wavelengths is used in the optical device 800, a deviation occurs between the condensation positions in the optical axis direction according to the wavelengths, due to the light passing through the transparent collimator 810.

Furthermore, even in a case where the transparent collimator 810 can substantially collimate light having a specific wavelength, there are cases where the transparent collimator 810 cannot collimate light having other wavelengths to the same degree. Therefore, the condensation amount of the light emitted from the optical device 800 can differ according to the wavelength.

Furthermore, in the optical device 800, when the width of the ring-shaped light incident to the truncated cone prism 840 becomes large, the condensation amount of the irradiation light to be radiated onto the target object becomes low, and therefore the resolution in the optical axis direction drops. In order to increase the condensation amount of the irradiation light, it is necessary to reduce the width of the ring-shaped light incident to the truncated cone prism 840, and in order to achieve this, it is necessary to reduce the diameter of the light incident to the axicon lens 820. However, in general, the machining precision of a peak portion 825 of the conical surface 822 of the axicon lens 820 is lower than that of other portions, and therefore the light passing through the peak portion 825 is prone to scattering. When the diameter of the light incident to the axicon lens 820 is reduced, the luminous flux density of the central portion of the incident light increases, and therefore the amount of luminous flux scattered at the peak portion 825 of the axicon lens 820 increases. Therefore, when the diameter of the light incident to the axicon lens 820 is reduced in order to increase the condensation amount of the irradiation light, the energy loss of the irradiation light increases.

As described in relation to FIGS. 19 to 23, with the basic configuration of the optical device in the photoacoustic microscope, the condensation position differs according to the wavelength, which makes it necessary to adjust the condensation position, and this leads to a problem that it is impossible to quickly image a target object using many different wavelengths. Furthermore, there is a problem that it is not easy to sufficiently increase the condensation amount of the irradiation light.

Figure 1:
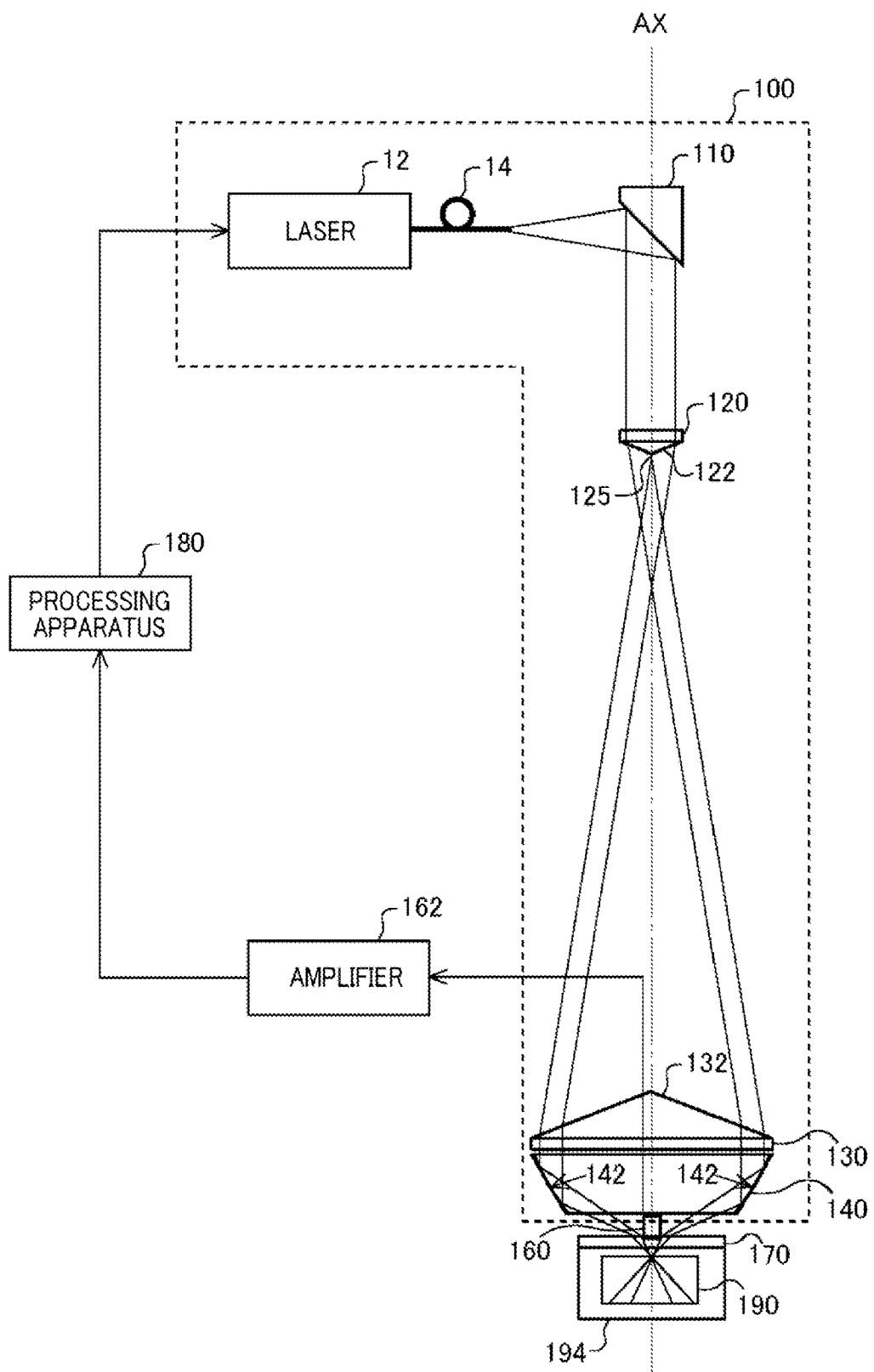
FIG. 1 schematically shows a configuration of a photoacoustic microscope 10 according to an embodiment.

FIG. 1 schematically shows a configuration of a photoacoustic microscope 10 according to an embodiment. The photoacoustic microscope 10 is a so-called AR-PAM (acoustic resolution photoacoustic microscope). The photoacoustic microscope 10 includes an optical device 100, an acoustic wave sensor 160, a transparent board 170, an amplifier 162, and a processing apparatus 180. The optical device 100 includes a laser 12, an optical fiber 14, a reflective collimator 110, an axicon lens 120, an axicon lens 130, and a condensing mirror 140.

The laser 12 can generate laser light with different wavelengths. The laser 12 is an example of a multi-wavelength light source. The light emitted by the laser 12 is collimated and becomes incident to the axicon lens 120.

Specifically, the light generated by the laser 12 becomes incident to one end portion of the optical fiber 14 and is emitted as divergent light from the other end portion of the optical fiber 14. The reflective collimator 110 collimates the divergent light incident thereto, by reflecting this divergent light. Specifically, the reflective collimator 110 has a reflective surface with a curved shape that collimates the divergent light. Since the reflective collimator 110 collimates the incident light using reflection, there is substantially no focal point deviation in the optical axis AX direction due to the wavelength.

The light collimated by the reflective collimator 110 becomes incident to the axicon lens 120. The axicon lens 120 forms the diverging ring-shaped light from the light incident thereto.

The ring-shaped light formed by the axicon lens 120 becomes incident to the axicon lens 130, and the axicon lens 130 forms ring-shaped collimated light. Here, the collimated light formed by the axicon lens 130 may refer to light that is substantially collimated. The collimated light formed by the axicon lens 130 may refer to light with a higher degree of parallelism than the ring-shaped light incident to the axicon lens 130.

As an example, the axicon lens 120 and the axicon lens 130 substantially have optical symmetry. Specifically, the axicon lens 130 has substantially the same apex angle as the axicon lens 120. In a case where the refractive index of the axicon lens 130 is the same as the refractive index of the axicon lens 120, the apex angle of the axicon lens 130 is preferably substantially the same as the apex angle of the axicon lens 120. However, if the refractive index of the axicon lens 130 differs from the refractive index of the axicon lens 120, such as in a case where the axicon lens 130 is formed of a different material than the axicon lens 120, the apex angle of the axicon lens 130 may differ from the apex angle of the axicon lens 120, such that the axicon lens 130 can form the collimated light. The axicon lens 130 is provided such that a conical surface 132 of the axicon lens 130 faces a conical surface 122 of the axicon lens 120.

In this way, the light collimated by the reflective collimator 110 becomes incident to the axicon lens 120 and the axicon lens 130, which are optically symmetric, to become collimated ring-shaped light. In this way, even if different wavelengths are used, the light emitted from the axicon lens 130 can be collimated. It is possible for the inner diameter and the outer diameter of the ring-shaped collimated light emitted from the axicon lens 130 to differ according to the wavelength, but the difference in parallelism due to the wavelength is small.

The condensing mirror 140 condenses the ring-shaped collimated light formed by the axicon lens 130. The condensing mirror 140 is a parabolic mirror, for example. The condensing mirror 140 has a reflective surface 142, represented by a parabolic rotating body, to condense the parallel light incident thereto into a point. In this way, the condensing mirror 140 can condense the ring-shaped collimated light formed by the axicon lens 130 at a specific position on the target object, using reflection. Since the condensing mirror 140 condenses the incident light using reflection, the condensation position and condensation amount do not substantially depend on the wavelength.

For example, as described above, it is possible for the inner diameter and the outer diameter of the ring-shaped collimated light emitted from the axicon lens 130 to differ according to the wavelength, but the difference in parallelism due to the wavelength is small. Since the condensing mirror 140 is designed to converge the collimated light into a specific point no matter where on the reflective surface this collimated light is incident, the condensing mirror 140 can condense this light to the specific point even if the inner diameter and the outer diameter of the collimated light incident thereto differ due to the wavelength.

Furthermore, by using the condensing mirror 140, the condensation amount is not substantially reduced even when the ring amplitude of the ring-shaped collimated light incident thereto increases, and therefore it is possible to increase the diameter of the collimated light incident to the axicon lens 120. By increasing the diameter of the collimated light incident to the axicon lens 120, it is possible to reduce the amount of luminous flux scattered by a peak portion 125 of the axicon lens 120. Therefore, it is possible to reduce the energy loss of the irradiation light. In this way, it is possible to increase the usage efficiency of the light energy generated by the laser 12.

The acoustic wave sensor 160 is fixed to the transparent board 170. The transparent board 170 is provided between the condensing mirror 140 and a target object 190. The acoustic wave sensor 160 is provided to be acoustically coupled to the target object 190. For example, the acoustic wave sensor 160 is provided to contact water 194, which serves as an acoustic matching material. The transparent board 170 may be provided in contact with the water 194. The transparent board 170 is formed of a material that transparently passes the light emitted by the laser 12. The light from the condensing mirror 140 becomes incident to the target object 190, through a region around the acoustic wave sensor 160.

The acoustic wave sensor 160 and the optical device 100 are positionally aligned such that the condensation position of the light from the condensing mirror 140 to the target object 190 and the focal point position of the acoustic lens of the acoustic wave sensor 160 match. For example, the acoustic wave sensor 160 and the optical device 100 are positionally aligned by adjusting the position of the transparent board 170 in the optical axis AX direction and in a direction orthogonal to the optical axis AX. According to the optical device 100, it is possible to independently adjust the positions of the optical device 100 and the acoustic wave sensor 160, and therefore it is easy to positionally align the focal point of the optical device 100 and the focal point of the acoustic wave sensor 160.

When the light from the condensing mirror 140 becomes incident to the target object 190, an acoustic wave is generated from a specific position corresponding to the condensation position in the target object 190. The generated acoustic wave passes through the water 194 to arrive at the acoustic wave sensor 160. The acoustic wave sensor 160 generates an acoustic wave signal by detecting the acoustic wave generated at the focal point position of the acoustic lens. The acoustic wave signal is supplied to the amplifier 162 as an electric signal and amplified, and is then supplied to the processing apparatus 180.

The processing apparatus 180 calculates the strength of the photoacoustic wave of the target object 190 from the electrical signal amplified by the amplifier 162. The processing apparatus 180 acquires an image of the target object 190 by measuring the photoacoustic wave while moving the target object 190 and the optical device 100 relative to each other in a plane orthogonal to the optical axis AX. For example, based on an acoustic wave caused by light having a first wavelength condensed by the condensing mirror 140 and an acoustic wave caused by light having a second wavelength that is different from the light having the first wavelength condensed by the condensing mirror 140, the processing apparatus 180 generates the image of the target object 190 that has been irradiated with the light having the first wavelength that has been condensed by the condensing mirror 140 and the light having the second wavelength.

In a case where an image of a blood vessel, as an example of the target object 190, is acquired, the processing apparatus 180 switches between generating light having the first wavelength that is absorbed by arteries and veins and light having the second wavelength, for which the ratio between the absorption coefficient for arteries and the absorption coefficient for veins differs from that of the light having the first wavelength, from the laser 12. The processing apparatus 180 generates the blood vessel image in which the arteries and veins are distinguished from each other, by detecting the arteries and veins at each position in a living body based on the magnitude of the photoacoustic wave detected by the acoustic wave sensor 160. According to the optical device 100, the deviation of the condensation position in the optical axis AX direction due to the wavelength is small, and therefore there is no need to adjust the condensation position for each wavelength. Therefore, it is possible to detect the acoustic wave by switching the wavelength of the light irradiating the target object 190 at high speed. Accordingly, it is possible to quickly acquire the image of the target object 190 using light with many wavelengths.

Figure 2:
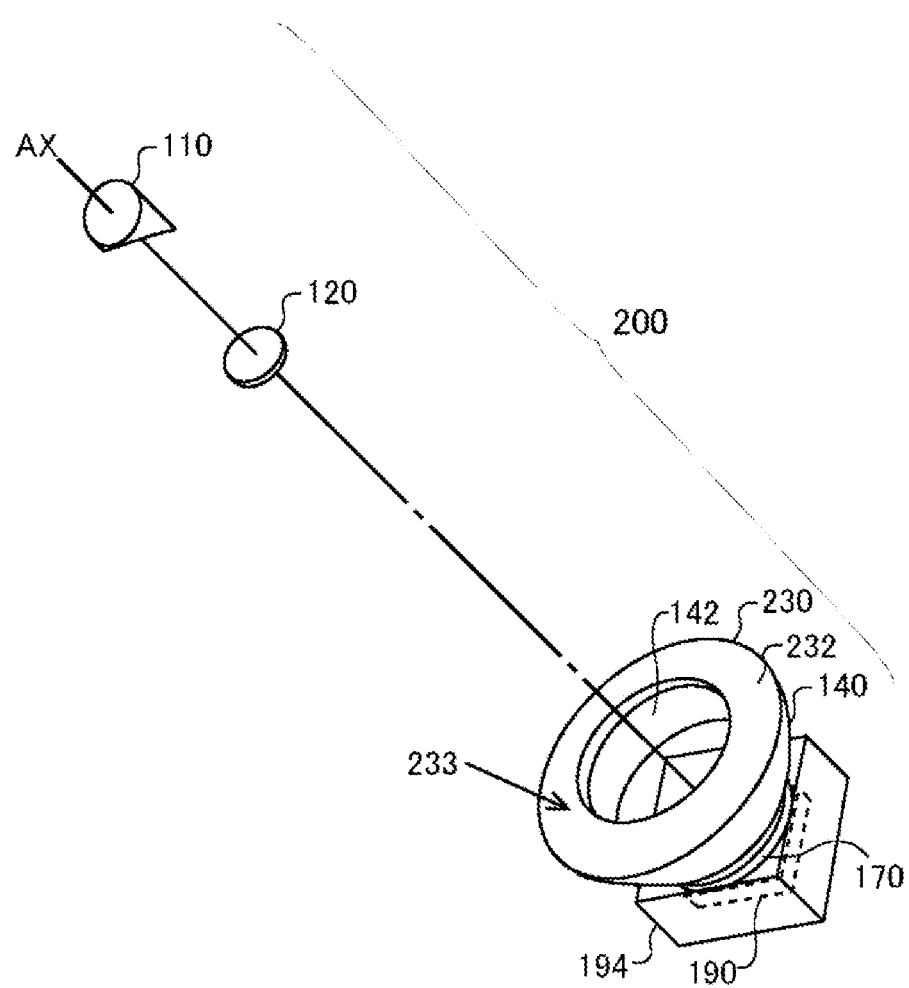
FIG. 2 is a perspective view schematically showing an arrangement of optical elements included in an optical device 200, as an example, along with the target object 190.
Figure 3:
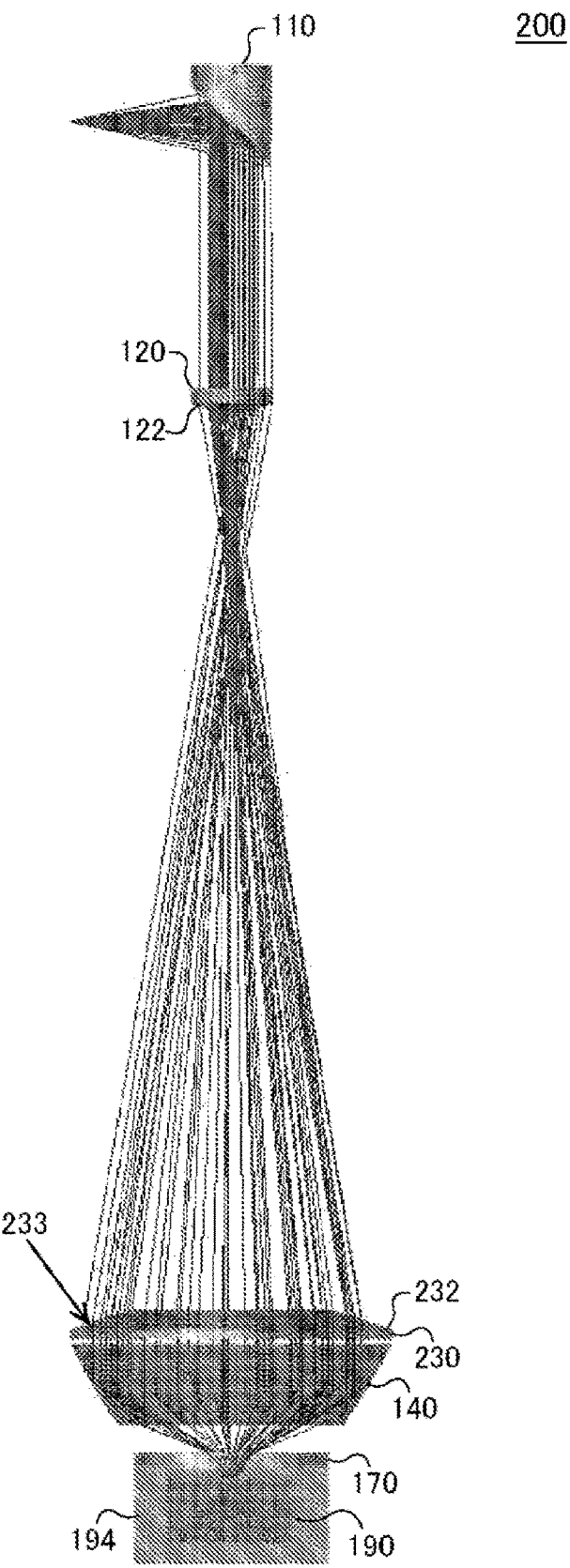
FIG. 3 schematically shows a ray diagram in the optical device 200.

FIG. 2 is a perspective view schematically showing an arrangement of optical elements included in an optical device 200, as an example of the present embodiment, along with the target object 190. FIG. 3 schematically shows a ray diagram in the optical device 200. The optical device 200 differs from the optical device 100 by including a convex lens 230 instead of the axicon lens 130 that is included in the optical device 100.

The convex lens 230 includes a surface 232 that has a convex curved surface 233. The convex lens 230 is provided such that the surface 232 faces the conical surface 122 of the axicon lens 120.

The light formed by the axicon lens 120 becomes incident to the convex curved surface 233, but does not enter farther to the AX side than the convex curved surface 233. The convex curved surface 233 has a shape that approximates the conical surface 122 of the axicon lens 120. Here, "approximates" may mean that, for example, in a region of the convex curved surface 233 where the light from the axicon lens 120 is incident, the difference between the apex angle of the conical surface formed by a tangent that touches the convex curved surface 233 and intersects the optical axis at a specific angle and the apex angle of the conical surface 122 of the axicon lens 120 is within a predetermined range. The "predetermined range" may be determined from the tolerable error of the collimation amount demanded of the convex lens 230. By using the convex lens 230 instead of the axicon lens 130, the manufacturing cost of the optical device 200 can be reduced.

Figure 4:
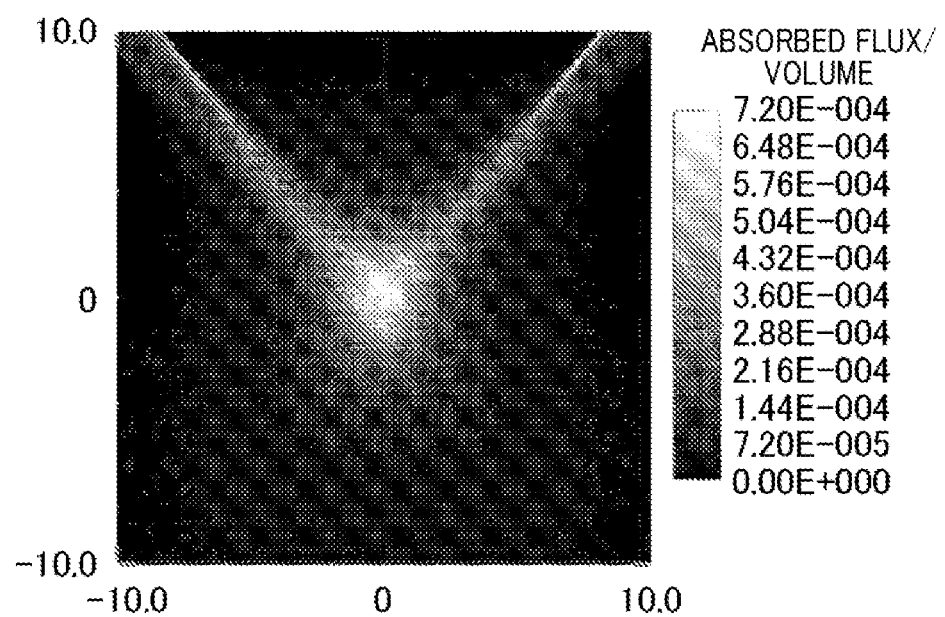
FIG. 4 shows an absorbed luminous flux amount per unit volume of light having a wavelength of 500 nm formed by the optical device 200.
Figure 5:
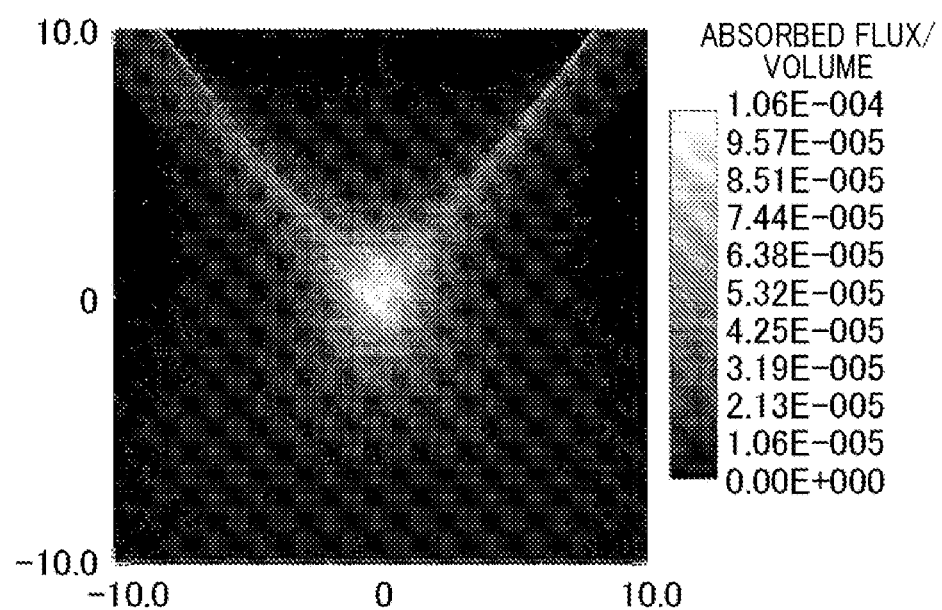
FIG. 5 shows an absorbed luminous flux amount per unit volume of light having a wavelength of 750 nm formed by the optical device 200.
Figure 6:
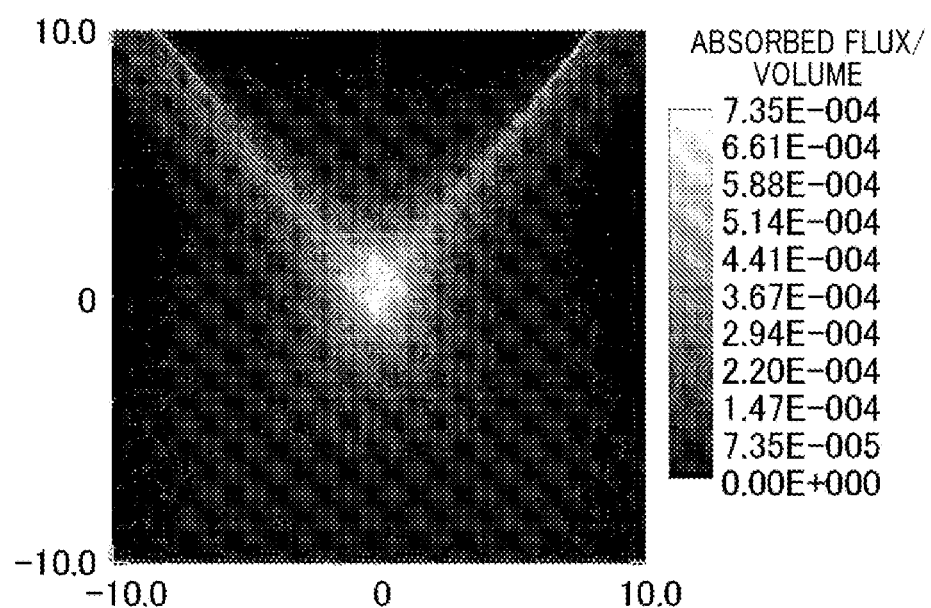
FIG. 6 shows an absorbed luminous flux amount per unit volume of light having a wavelength of 1000 nm formed by the optical device 200.

FIG. 4 shows an absorbed luminous flux amount per unit volume of light having a wavelength of 500 nm formed by the optical device 200. FIG. 5 shows an absorbed luminous flux amount per unit volume of light having a wavelength of 750 nm formed by the optical device 200. FIG. 6 shows an absorbed luminous flux amount per unit volume of light having a wavelength of 1000 nm formed by the optical device 200. In the distribution diagrams of the absorbed luminous flux amount shown in FIGS. 4 to 6, the vertical axes indicate the optical axis direction AX and the horizontal axes indicate a direction orthogonal to the optical axis AX, in the same manner as in the distribution diagrams of the absorbed luminous flux amount shown in FIGS. 21 to 23.

Based on a comparison between the absorbed luminous flux amounts shown in FIGS. 21 to 23 and the absorbed luminous flux amounts shown in FIGS. 4 to 6, it is understood that, with the optical device 200, the position at which the absorbed luminous flux amount is at a maximum does not deviate as much as with the optical device 800. In other words, it is understood that, according to the optical device 200, the condensation position in the optical axis direction does not deviate due to the wavelength, compared to the optical device 800. Furthermore, with the optical device 100, it is understood that the absorbed luminous flux amount per unit volume is greater than with the optical device 800.

As described above, by including the axicon lens, the lens that is substantially or approximately optically symmetric to the axicon lens, and the condensing mirror, it is possible to provide an optical device in which the deviation of the condensation position in the optical axis direction due to the wavelength is small. Furthermore, it is possible to provide an optical device with high condensation.

The convex lens 230 shown in FIGS. 2 and 3 may have a convex shape across the entire surface facing the conical surface 122 of the axicon lens 120. The convex lens 230 only needs to include at least the convex curved surface 233 in the region where the light from the axicon lens 120 is incident, and other regions may have any shape.

Furthermore, instead of the axicon lens 130 shown in FIG. 1, a lens may be used that has a surface optically symmetric to the conical surface of the axicon lens 120, at least in a region where the light from the axicon lens 120 is incident. For example, a lens may be used that has a conical surface only in a peripheral portion of the axicon lens 130. The axicon lens 130 as well only needs to include a surface that is optically symmetric to at least the axicon lens 120 in the region where the light from the axicon lens 120 is incident, and other regions may have any shape.

Figure 7:
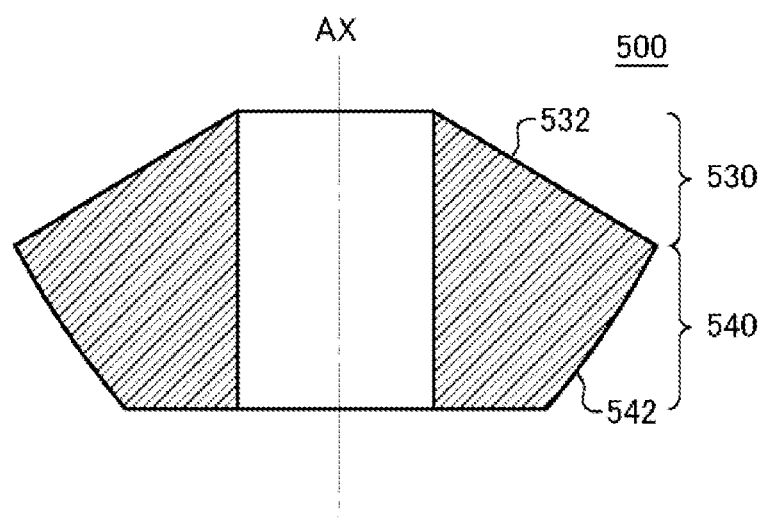
FIG. 7 is a cross-sectional diagram of an optical element 500, as a modification of the axicon lens 130 and the condensing mirror 140.

FIG. 7 is a cross-sectional diagram of an optical element 500, as a modification of the axicon lens 130 and the condensing mirror 140. The optical element 500 is single optical element in which the axicon lens 130 and the condensing mirror 140 are provided integrally. The optical element 500 has the effects of the axicon lens 130 and the condensing mirror 140.

The optical element 500 includes an axicon lens portion 530 and a condensing mirror portion 540. The axicon lens portion 530 has a conical surface 532 on a peripheral portion thereof. The condensing mirror portion 540 has a parabolic surface 542, which is a reflective surface with a parabolic shape. The optical element 500 is provided such that the conical surface 532 faces the conical surface 122 of the axicon lens 120.

The conical surface 532 of the axicon lens portion 530 has the effect of the conical surface 132 of the axicon lens 130. The parabolic surface 542 of the condensing mirror portion 540 has the effect of the reflective surface 142 of the condensing mirror 140. When the ring-shaped light formed by the axicon lens 120 becomes incident to the conical surface 532, the ring-shaped collimated light is formed by the conical surface 532 and progresses inside the optical element 500, to be internally totally reflected by the parabolic surface 542 and emitted from the optical element 500. Since the optical element 500 includes the conical surface 532 and the parabolic surface 542, it is possible to increase the condensation amount compared to a case in which the truncated cone prism 740 is used.

Figure 8:
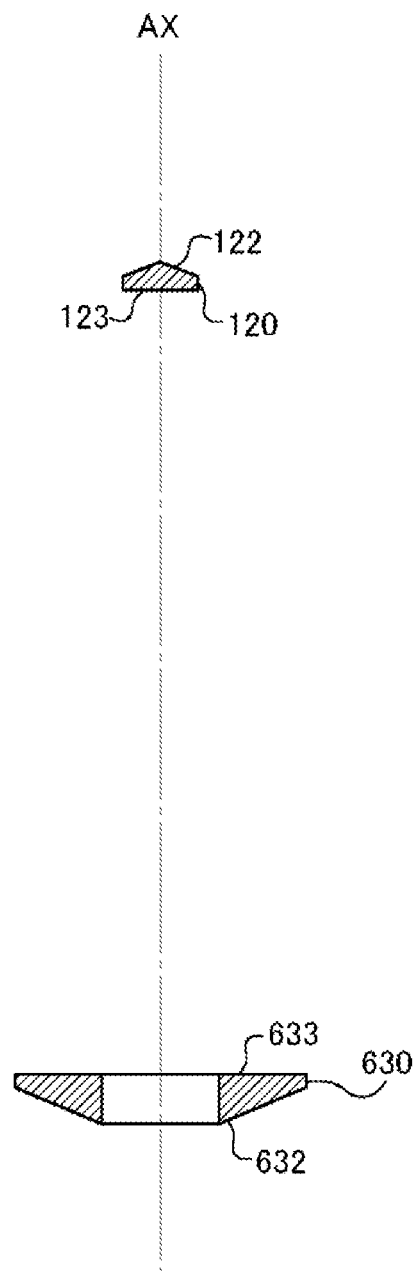
FIG. 8 is a cross-sectional view of an example of another exemplary arrangement of the axicon lens.

In the optical device 100, the axicon lens 130 is arranged such that the conical surface of the axicon lens 130 faces the conical surface of the axicon lens 120. As another arrangement example, the axicon lens 120 may be arranged such that the conical surface 122 faces the reflective collimator 110, and the axicon lens 130 may be arranged such that the floor surface of the axicon lens 130 faces the floor surface of the axicon lens 120. As an example of this exemplary arrangement, FIG. 8 shows a cross section of the axicon lens 120 and an axicon lens 630. The axicon lens 630 has a conical surface 632, corresponding to the conical surface 132 of the axicon lens 130, at a peripheral portion thereof, and has the same effect as the axicon lens 130. The axicon lens 120 is arranged such that the conical surface 122 faces the reflective collimator 110, and the axicon lens 630 is arranged such that a floor surface 633 faces a floor surface 123 of the axicon lens 120. Similarly, in the optical device 200, the axicon lens 120 is arranged such that the conical surface 122 faces the reflective collimator 110, and the convex lens 230 is arranged such that a floor surface of the convex lens 230 faces the floor surface of the axicon lens 120.

In the above description, an example is shown of a case in which an image of a blood vessel, as an example of the target object 190, is acquired, but the target object 190 is not limited to being a blood vessel or blood component. Various light-absorbing materials inside living organisms can be used as the target object 190. Furthermore, various objects that absorb light, and not just those in living organisms, can be used as the target object 190. For example, industrial products with joints made of different types of material may be used as target objects 190, and the photoacoustic microscope 10 may be used as an inspection apparatus for delamination of the joints made of different types of material.

Figure 9:
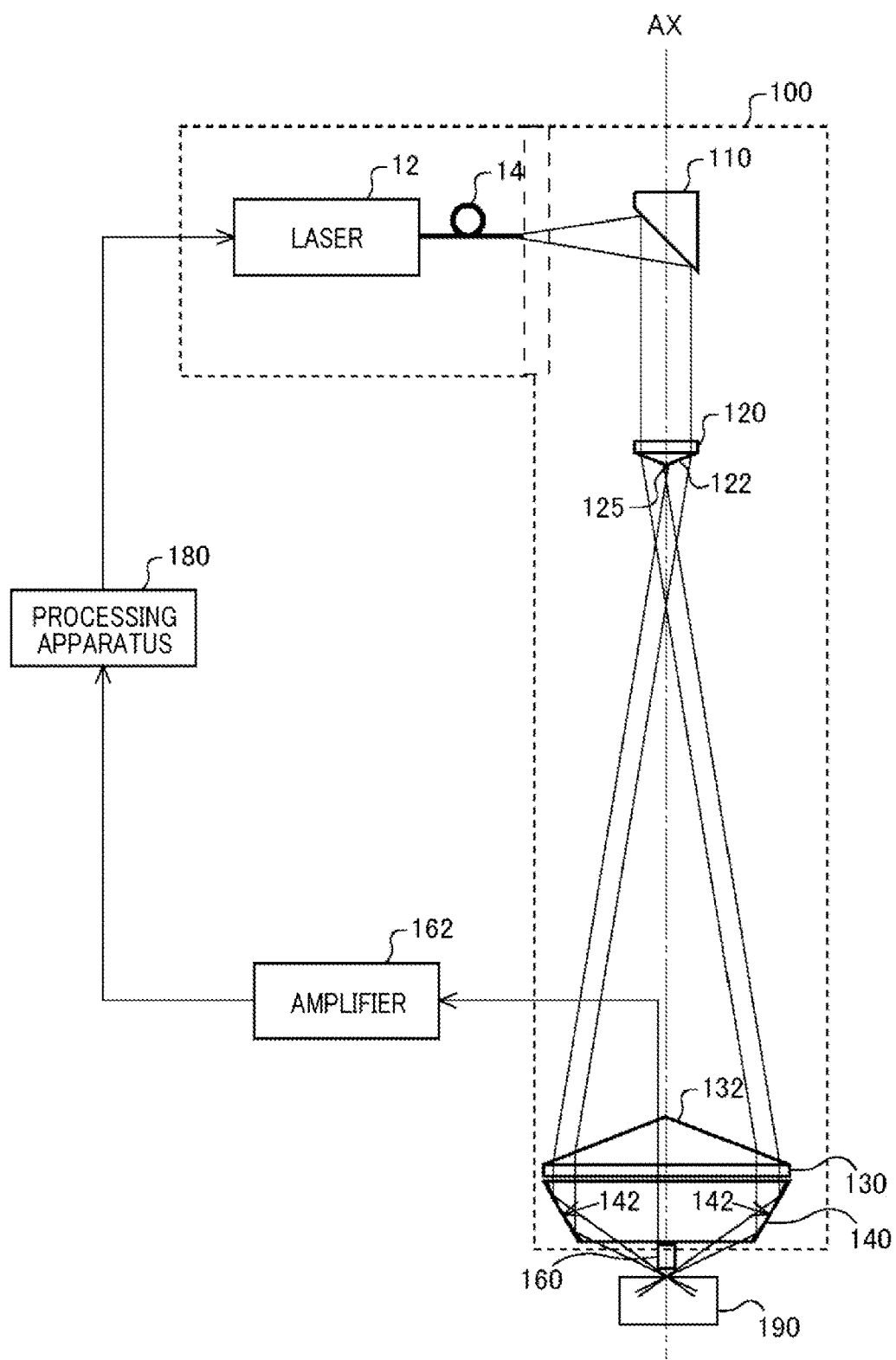
FIG. 9 schematically shows the configuration of a photoacoustic microscope 20 according to another embodiment.

FIG. 9 schematically shows the configuration of a photoacoustic microscope 20 according to another embodiment. The photoacoustic microscope 20 is an AR-PAM, in the same manner as the photoacoustic microscope 10. The photoacoustic microscope 20 includes the optical device 100, the acoustic wave sensor 160, the amplifier 162, and the processing apparatus 180. Among the configurational elements of the photoacoustic microscope 20, configurational elements that are the same as those of the photoacoustic microscope 10 are given the same reference numerals.

The photoacoustic microscope 20 differs from the photoacoustic microscope 10 in that the acoustic wave sensor 160 and the target object 190 are acoustically coupled without using water as the acoustic coupling medium.

In the photoacoustic microscope 20, the acoustic wave sensor 160 is acoustically coupled to the target object 190 via gas in the air, for example. Accordingly, the acoustic wave sensor 160 detects the acoustic wave generated by the light condensed by the condensing mirror 140 and propagated through the air. A liquid other than water or any gas other than air may be used as the acoustic coupling medium. A solid that transparently passes the light generated by the laser 12 may be used as the acoustic coupling medium. The acoustic coupling medium may be a living organism.

Unlike the photoacoustic microscope 10, the photoacoustic microscope 20 does not need to include the transparent board 170 as the acoustic wave sensor 160 holding means. A means other than the transparent board 170 can be used as the acoustic wave sensor 160 holding means, as long as it is capable of holding the acoustic wave sensor 160 in a manner that does not obstruct the light headed from the condensing mirror 140 toward the target object 190.

Figure 10:
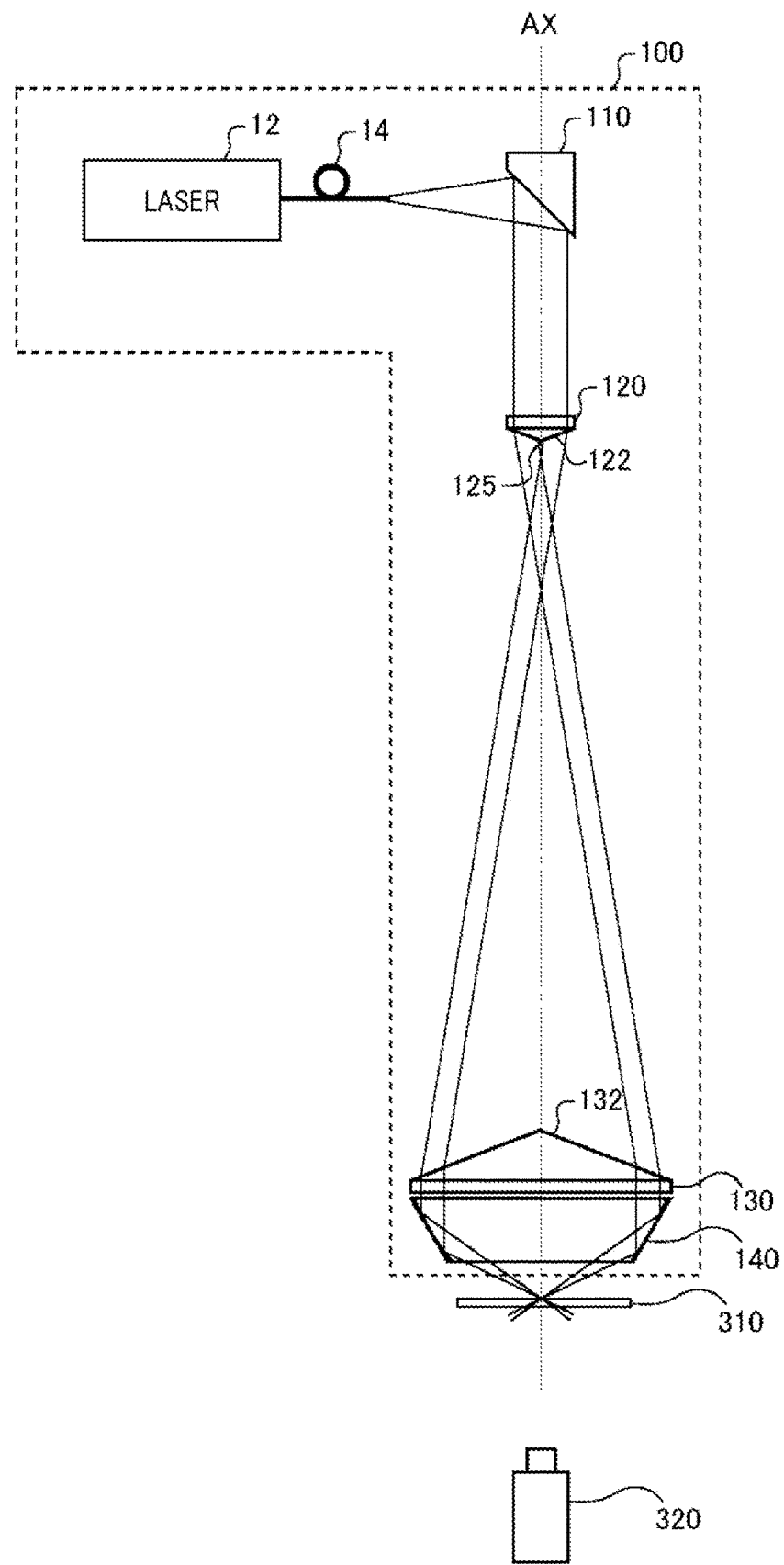
FIG. 10 schematically shows an experimental system for measuring a beam diameter of the emission light of the optical device 100.

FIG. 10 schematically shows an experimental system for measuring a beam diameter of the emission light of the optical device 100. The experimental system includes ground glass 310 to which the emission light of the optical device 100 is incident and an imaging apparatus 320 that captures an image of the ground glass 310.

The ground glass 310 is provided between the condensing mirror 140 and the imaging apparatus 320. The ground glass 310 is provided such that the position thereof in the optical axis AX direction from the condensing mirror 140 is adjustable. The imaging apparatus 320 is a camera that includes a CMOS image sensor. The imaging apparatus 320 is provided such that the imaging optical axis thereof matches the optical axis AX. The imaging apparatus 320 captures an image in a state where the ground glass 310 is focused on. The imaging apparatus 320 captures an image of the ground glass 310 in a state where laser light with a specific wavelength has been generated from the laser 12, and the diameter of a bright portion of the obtained image is measured as the beam diameter of the emission light of the optical device 100. The diameter of the bright portion is expressed in units of pixels forming the imaging acquired by the imaging apparatus 320.

Figure 11:
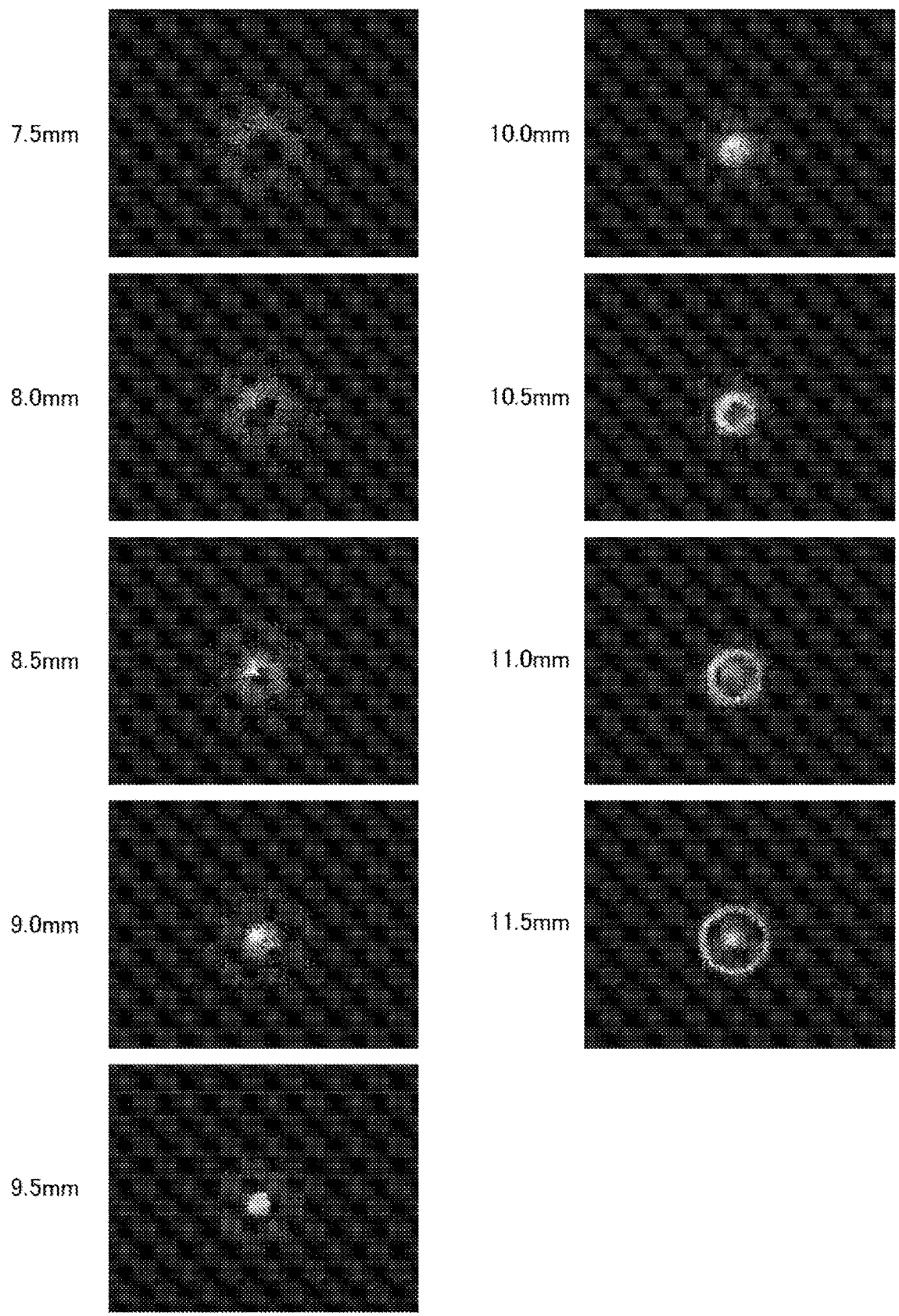
FIG. 11 shows images captured in a state where laser light with a wavelength of 405 nm has been generated.
Figure 12:
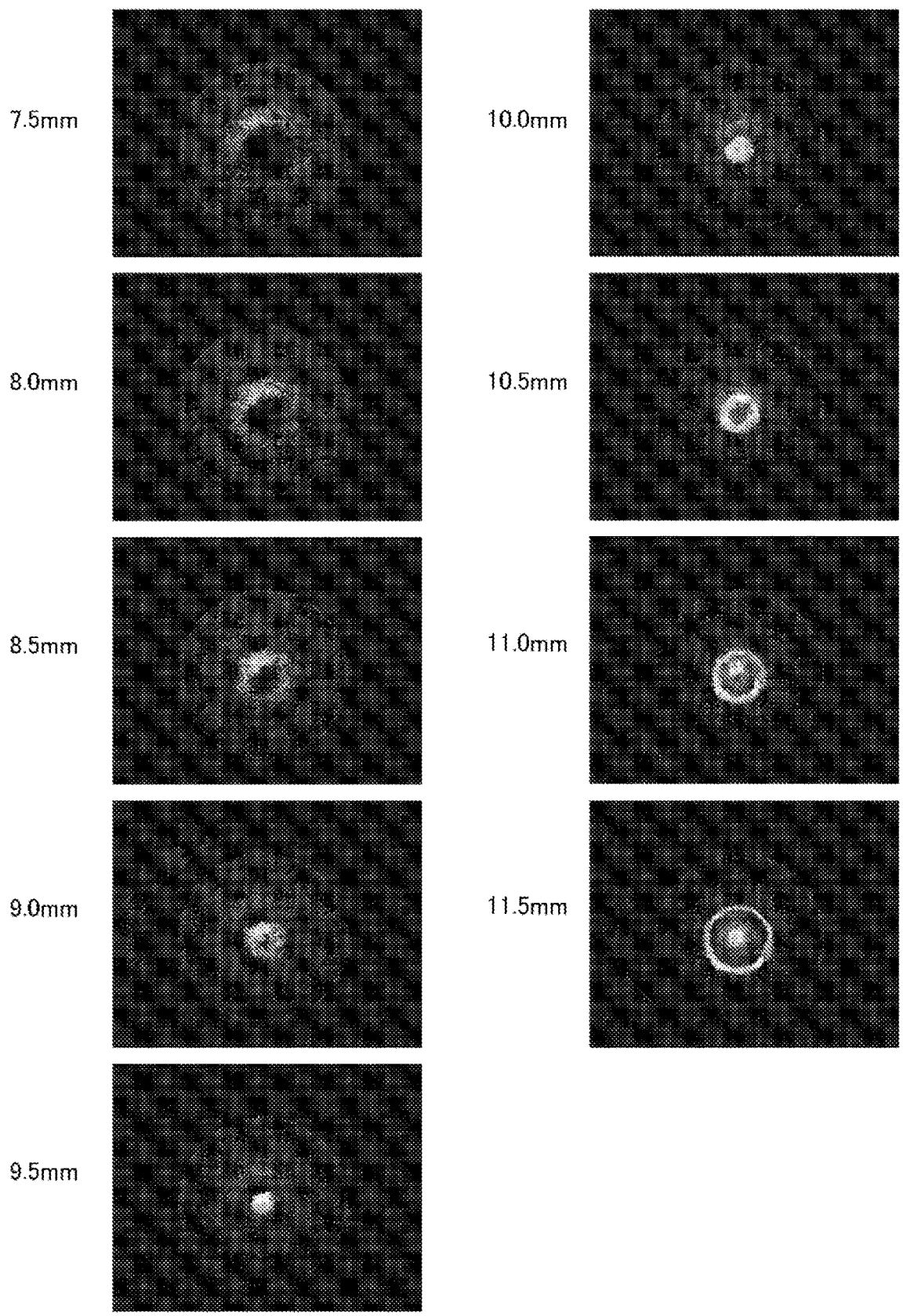
FIG. 12 shows images captured in a state where laser light with a wavelength of 808 nm has been generated.

FIG. 11 shows images captured in a state where laser light with a wavelength of 405 nm has been generated. The numerical value shown near each image indicates the position in the optical axis AX direction. FIG. 12 shows images captured in a state where laser light with a wavelength of 808 nm has been generated. The numerical value shown near each image indicates the position in the optical axis AX direction.

From FIGS. 11 and 12, it is understood that both the light with a wavelength of 405 nm and the light with a wavelength of 808 nm are condensed near a position of 9.5 mm in the optical axis AX direction. In other words, it is understood that, according to the optical device 100, the deviation of the condensation position in the optical axis AX direction due to the wavelength is extremely small.

On the assumption that the optical system of the optical device 100 is ideal, the emission light from the optical device 100 is completely ring-shaped, and therefore the bright portion of the image is also ring-shaped. However, in actuality, there are cases where a bright portion also occurs in the center of the ring-shaped bright portion, as shown in the images at the position of 11.5 mm in FIGS. 11 and 12, for example. This bright portion inside the ring-shaped bright portion is thought to occur due to the effect of machining efficiency of the peak portions of the axicon lens 120 and the axicon lens 130. For example, since the peak portions of the axicon lens 120 and the axicon lens 130 are rounded when viewed finely, and not perfect points, it is thought that the bright portion inside the ring-shaped bright portion occurs due to the light scattered by the peak portions of the axicon lens 120 and the axicon lens 130. Accordingly, when calculating the beam diameter from the bright portion, the bright portion inside the ring-shaped bright portion is not taken into account.

Figure 13:
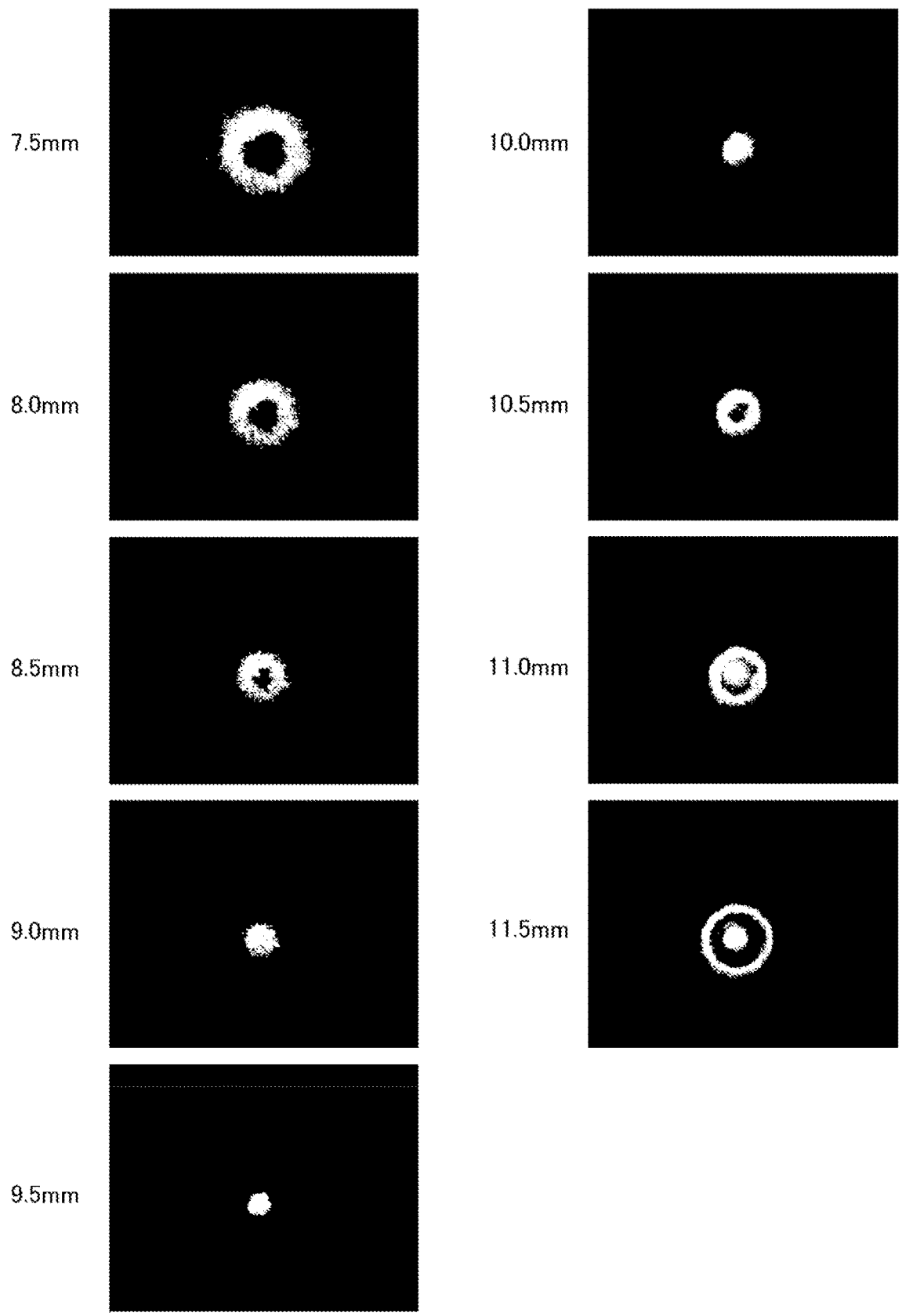
FIG. 13 shows binary images obtained by binarizing the images captured in a state where the laser light with a wavelength of 405 nm has been generated.

FIG. 13 shows binary images obtained by binarizing the images captured in a state where the laser light with a wavelength of 405 nm has been generated. The numerical value near each binary image shows the position in the optical axis AX direction.

Figure 14:
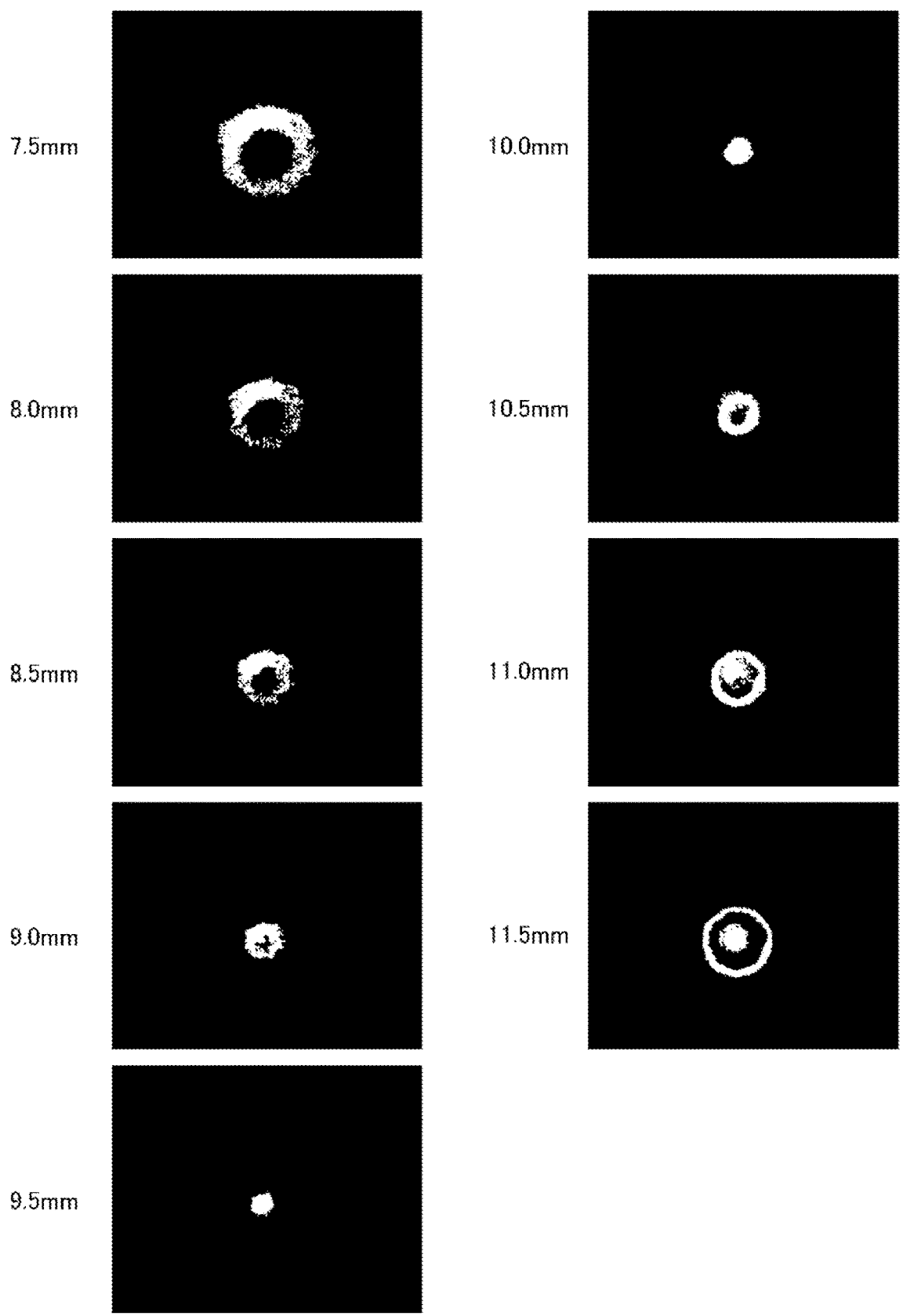
FIG. 14 shows binary images obtained by binarizing the images captured in a state where the laser light with a wavelength of 808 nm has been generated.

FIG. 14 shows binary images obtained by binarizing the images captured in a state where the laser light with a wavelength of 808 nm has been generated. The numerical value near each binary image shows the position in the optical axis AX direction.

Figure 15:
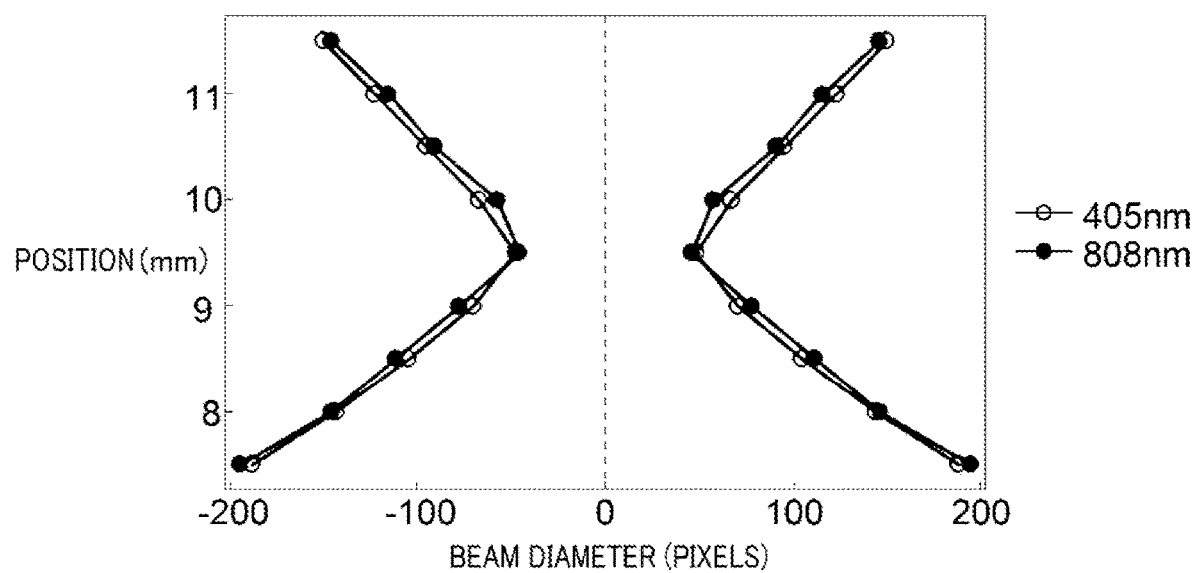
FIG. 15 shows a profile of the emission light of the optical device 100.

FIG. 15 shows a profile of the emission light of the optical device 100. In FIG. 15, the horizontal axis indicates the beam diameter, and the vertical axis indicates the position in the optical axis AX direction. The beam diameter is calculated from the outer diameter of the bright portion in the binary image. As described above, the size of the beam diameter is expressed in pixel units.

From FIG. 15, it is understood that the light with a wavelength of 405 nm and the light with a wavelength of 808 nm emitted from the optical device 100 have approximately the same profile. Accordingly, it is understood that with the optical device 100, the deviation of the condensation positions in the optical axis direction and the difference in condensation amounts between the light with a wavelength of 405 nm and the light with a wavelength of 808 nm are both extremely small.

Figure 16:
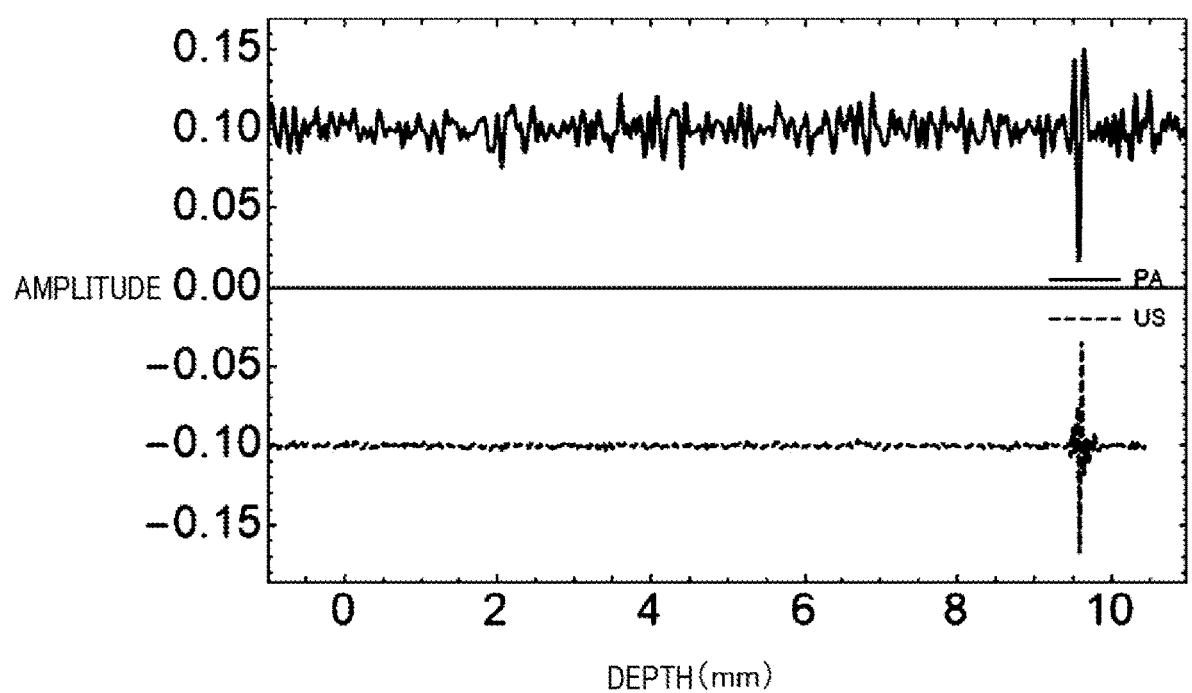
FIG. 16 is a graph showing the results of a verification experiment of the photoacoustic measurement by the photoacoustic microscope 10.

FIG. 16 is a graph showing the results of a verification experiment of the photoacoustic measurement by the photoacoustic microscope 10. This verification experiment was performed by using a metal member having a surface that has undergone black alumite processing as the target object 190 in the photoacoustic microscope 10 shown in FIG. 1, and making a comparison between the measurement result of an ultrasonic wave signal detected by the acoustic wave sensor 160 when the surface of the member was irradiated with light from the optical device 100 and the measurement result of an ultrasonic wave signal detected by the acoustic wave sensor 160 when the an ultrasonic wave was generated from the acoustic wave sensor 160.

In the graph of FIG. 16, the vertical axis indicates the signal strength of the ultrasonic wave detected by the acoustic wave sensor 160. In the graph of FIG. 16, the horizontal axis indicates the position of the source generating the ultrasonic wave. In the graph of FIG. 16, PA indicates the positional dependency of the ultrasonic wave signal obtained when the metal member was irradiated with light. In the graph of FIG. 16, US indicates the positional dependency of the ultrasonic wave signal obtained when the ultrasonic wave signal was generated from the acoustic wave sensor 160. The horizontal axis of the US graph indicates a value obtained by converting the ultrasonic wave propagation time into a position in the optical axis AX direction, using the propagation speed of an ultrasonic wave in water.

In the graph of FIG. 16, the peak position of the ultrasonic wave signal obtained when the metal member was irradiated with light approximately matches the peak position of the ultrasonic wave signal obtained when the ultrasonic wave was generated from the acoustic wave sensor 160. Accordingly, it was possible to verify that the ultrasonic wave signal measured when the metal member was irradiated with light is the photoacoustic wave generated by the metal member.

Figure 17:
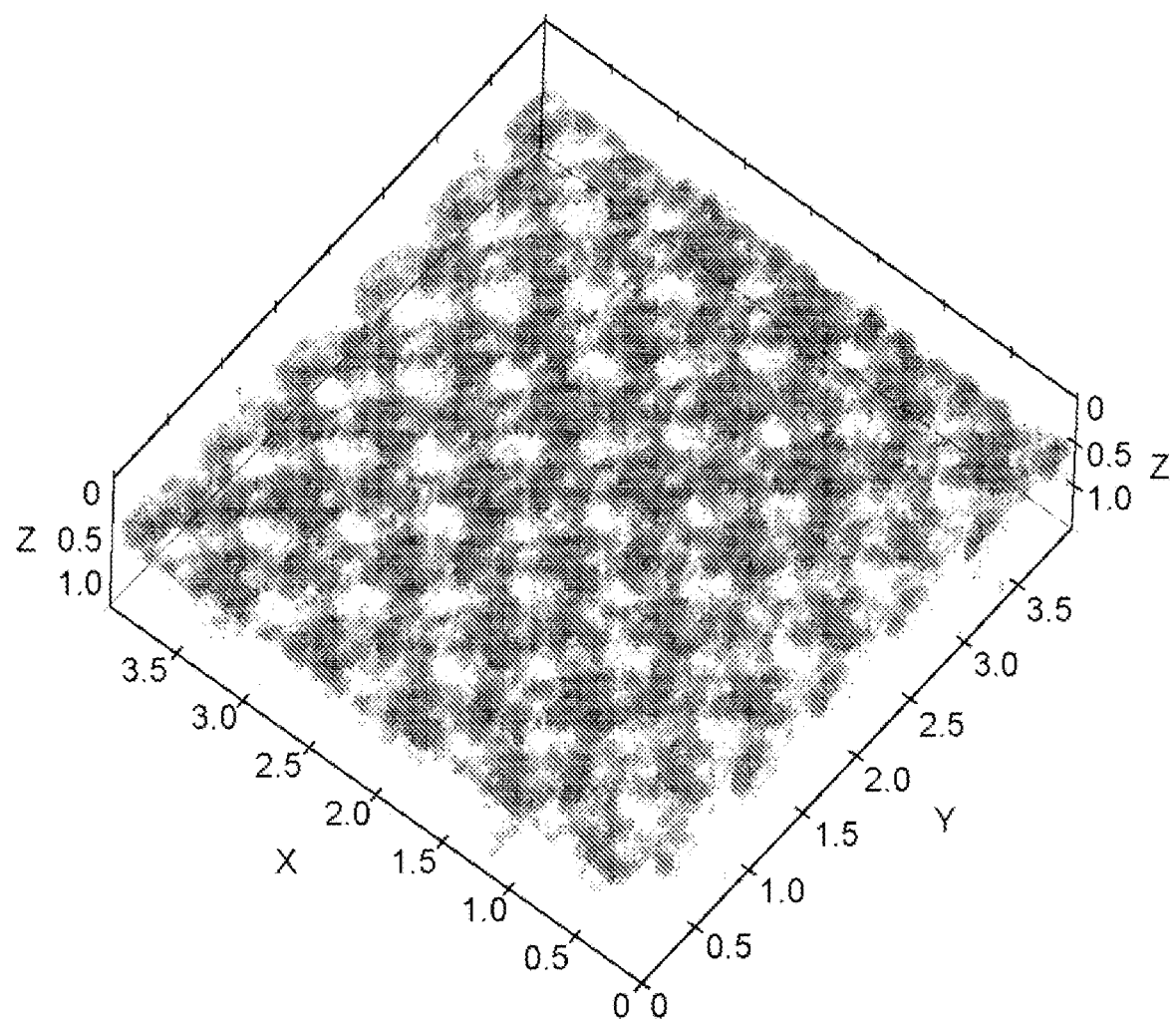
FIG. 17 shows a photoacoustic image of metal mesh obtained by the photoacoustic microscope 10.
Figure 18:
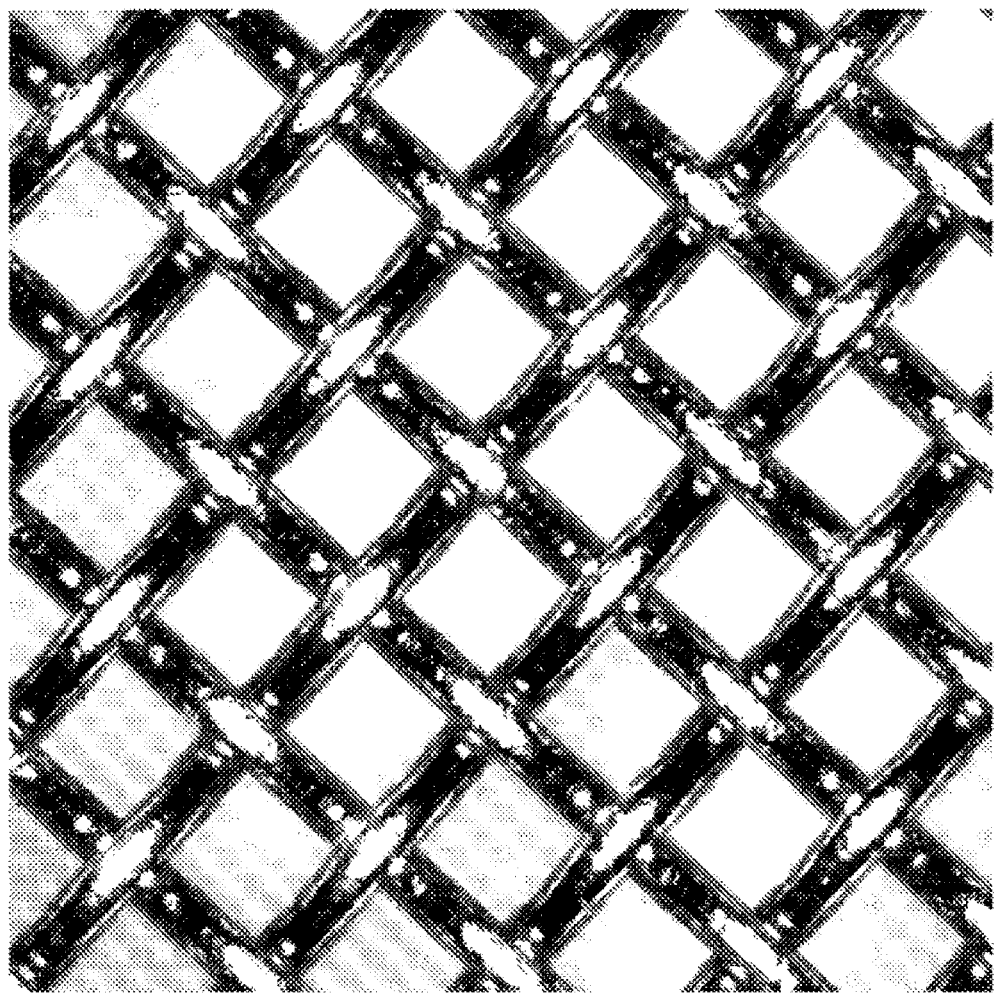
FIG. 18 shows a visible light image of the metal mesh serving as the target object 190.

FIG. 17 shows a photoacoustic image of metal mesh obtained by the photoacoustic microscope 10. FIG. 17 is a photoacoustic image in a case where metal mesh (line diameter of 0.18 mm and mesh interval of 0.51 mm) made of SUS 304 is used as the target object 190. The wavelength of the laser 12 used to obtain the photoacoustic image is 1064 nm, and the central frequency of the acoustic wave sensor 160 is 15 MHz. FIG. 18 shows a visible light image of the metal mesh serving as the target object 190.

The portions having a high concentration in FIG. 17 indicate portions where the metal mesh is present. The imaging in the XY direction, which is orthogonal to the optical axis AX, was performed by detecting the photoacoustic signal of the metal mesh at a plurality of points in the XY plane by scanning with the optical system of the optical device 100 and the acoustic wave sensor 160 in the XY direction. As shown in FIG. 17, it was possible to verify that the binarization could be performed in a manner to make mesh with an interval of approximately 0.5 mm visible.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10, 20. photoacoustic microscope
12. laser
14. optical fiber
100. optical device
110. reflective collimator
120. axicon lens
122. conical surface
123. floor surface
125. peak portion
130. axicon lens
132. conical surface
140. condensing mirror
142. reflective surface
160. acoustic wave sensor
162. amplifier
170. transparent board
180. processing apparatus
190. target object
194. water
200. optical device
230. convex lens
232. surface
233. convex curved surface
310. ground glass
320. imaging apparatus
500. optical element
530. axicon lens portion
532. conical surface
540. condensing mirror portion
542. parabolic surface
630. axicon lens
632. conical surface
633. floor surface
700. photoacoustic microscope
712. laser
714. optical fiber
720. lens
740. truncated cone prism
741. line
742. line
760. acoustic wave sensor
762. amplifier
790. target object
792. water tank
800. optical device
810. transparent collimator
820. axicon lens
840. truncated cone prism
890. target object
892. water tank
822. conical surface
825. peak portion

What is claimed is:

1. A photoacoustic microscope comprising:
    a multi-wavelength light source;
    an optical waveguide connected to the multi-wavelength light source wherein multi-wavelength light emitted from the optical waveguide is divergent light;
    a reflective collimator that collimates the divergent light emitted from the optical waveguide, by reflecting the divergent light;

a first axicon lens to which the collimated light is incident and which is configured to form diverging ring-shaped light;

a lens to which the ring-shaped light formed by the first axicon lens is incident and which is configured to form ring-shaped collimated light;

a ring-shaped condensing mirror that is configured to condense the ring-shaped collimated light formed by the lens;

a detector that is configured to detect acoustic waves caused by light condensed by the condensing mirror; and a processing apparatus that is configured to generate, based on an acoustic wave caused by light having a first wavelength condensed by the condensing mirror and an acoustic wave caused by light having a second wavelength condensed by the condensing mirror, the wavelength of the light having the first wavelength different from the wavelength of the light having the second wavelength, an image of an object irradiated with the light having the first wavelength condensed by the condensing mirror and the light having the second wavelength condensed by the condensing mirror;

wherein the image of the object shows a first feature of the object corresponding to the acoustic wave caused by the light having the first wavelength condensed by the condensing mirror and a second feature of the object corresponding to the acoustic wave caused by the light having the second wavelength condensed by the condensing mirror, the first feature and the second feature stylistically different; and wherein the light irradiating the object is switched at a high speed by the multi-wavelength light source between the light having the first wavelength and the light having the second wavelength.

2. The photoacoustic microscope according to claim 1, wherein
the first axicon lens and the lens are optically symmetric.

3. The photoacoustic microscope according to claim 1, wherein
the lens is a second axicon lens with an apex angle that is substantially the same as an apex angle of the first axicon lens.

4. The photoacoustic microscope according to claim 3, wherein
the lens is provided such that a conical surface of the lens faces a conical surface of the first axicon lens.

5. The photoacoustic microscope according to claim 1, wherein
the lens is a convex lens in which a surface to which at least the ring-shaped light is incident has a convex curved surface approximating a conical surface of the first axicon lens.

6. The photoacoustic microscope according to claim 5, wherein
the lens is provided such that the surface having the convex curved surface faces the conical surface of the first axicon lens.

7. The photoacoustic microscope according to claim 1, wherein
the condensing mirror and the lens are provided integrally.

8. The photoacoustic microscope according to claim 1, wherein
the detector is configured to detect the acoustic wave that has propagated through air.

* * * * *